US009272290B2

(12) United States Patent
Irmscher et al.

(10) Patent No.: US 9,272,290 B2
(45) Date of Patent: Mar. 1, 2016

(54) APPARATUS FOR THE ENRICHMENT OF MAGNETIC PARTICLES

(75) Inventors: Matthias Irmscher, Berlin (DE); Remco Den Dulk, Eindhoven (NL); Menno Willem Jose Prins, Rosmalen (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 496 days.

(21) Appl. No.: 13/384,251

(22) PCT Filed: Jul. 12, 2010

(86) PCT No.: PCT/IB2010/053176
§ 371 (c)(1), (2), (4) Date: Mar. 20, 2012

(87) PCT Pub. No.: WO2011/007310
PCT Pub. Date: Jan. 20, 2011

(65) Prior Publication Data

US 2012/0161754 A1 Jun. 28, 2012

(30) Foreign Application Priority Data

Jul. 17, 2009 (EP) .................................... 09165750

(51) Int. Cl.
*G01N 27/74* (2006.01)
*B03C 1/035* (2006.01)
(Continued)

(52) U.S. Cl.
CPC ............... *B03C 1/035* (2013.01); *B03C 1/0335* (2013.01); *B03C 1/002* (2013.01); *B03C 1/02* (2013.01); *B03C 1/025* (2013.01); *B03C 1/32* (2013.01)

(58) Field of Classification Search
CPC ...... B03C 1/035; B03C 1/0335; B03C 1/002; B03C 1/01; B03C 1/0332; B03C 1/032; B03C 1/034; B03C 1/32; B03C 1/288; B03C 1/286; B03C 1/04; B03C 1/06; B03C 1/08
USPC ............................ 324/204; 210/695; 335/306
See application file for complete search history.

(56) References Cited

U.S. PATENT DOCUMENTS 1,317,992 A 10/1919 Sekinger
3,608,718 A 9/1971 Aubrey
(Continued)

FOREIGN PATENT DOCUMENTS

CN 1506460A A 6/2004
CN 101563164 A 10/2009
(Continued)

OTHER PUBLICATIONS

Joung, J. et al "Micropumps based on Alternating High-Gradient Magnetic Fields" IEEE Transactions on Magnetics, vol. 36, No. 4, Jul. 2000 , pp. 2012-2014.
(Continued)

*Primary Examiner* — Huy Q Phan
*Assistant Examiner* — David Frederiksen

(57) ABSTRACT

The invention relates to a method and an apparatus (100) for the enrichment of magnetic particles (1) in a sample fluid. The sample fluid is provided in a sample cartridge (2) between a first pole (111) and a second pole (112) of an actuator magnet (110). A minimal magnetic flux as well as a minimal magnetic gradient are then established inside the sample fluid, wherein their values depend on the particular magnetic particles (1) and the sample fluid under consideration. In a preferred embodiment, the first pole (111) has a single tip (T).

19 Claims, 3 Drawing Sheets

(51) Int. Cl.

| | |
|---|---|
| ***B03C 1/033*** | (2006.01) |
| *B03C 1/025* | (2006.01) |
| *B03C 1/00* | (2006.01) |
| *B03C 1/02* | (2006.01) |
| *B03C 1/32* | (2006.01) |

(56) References Cited

U.S. PATENT DOCUMENTS

| | | | | |
|---|---|---|---|---|
| 3,645,377 | A | 2/1972 | Kirko | |
| 4,238,323 | A | 12/1980 | Ioffe | |
| 4,772,383 | A * | 9/1988 | Christensen | 209/223.1 |
| 4,784,767 | A * | 11/1988 | Hasuda et al. | 210/222 |
| 4,961,841 | A * | 10/1990 | Andres | B03B 7/00 209/1 |
| 5,200,084 | A * | 4/1993 | Liberti et al. | 210/695 |
| 5,411,863 | A | 5/1995 | Miltenyi | |
| 5,466,574 | A * | 11/1995 | Liberti et al. | 435/5 |
| 5,985,153 | A * | 11/1999 | Dolan et al. | 210/695 |
| 6,270,666 | B1 * | 8/2001 | Kamibayashi et al. | 210/222 |
| 7,056,657 | B2 * | 6/2006 | Terstappen et al. | 435/5 |
| 7,474,184 | B1 | 1/2009 | Humphries | |
| 8,268,177 | B2 * | 9/2012 | Ying et al. | 210/695 |
| 2003/0107946 | A1 * | 6/2003 | Cosby et al. | 366/127 |
| 2003/0127396 | A1 * | 7/2003 | Siddiqi | B03C 1/01 210/695 |
| 2004/0159612 | A1 * | 8/2004 | Franzreb et al. | B03C 1/0332 210/695 |
| 2005/0148064 | A1 * | 7/2005 | Yamakawa et al. | 435/287.2 |
| 2007/0056912 | A1 | 3/2007 | Oder | |
| 2007/0175830 | A1 * | 8/2007 | Brassard | 210/695 |
| 2009/0078614 | A1 * | 3/2009 | Varghese et al. | 209/39 |

FOREIGN PATENT DOCUMENTS

| | | | |
|---|---|---|---|
| DE | 2037088 | A1 | 2/1971 |
| EP | 1621890 | A1 | 2/2006 |
| GB | 549391 | A | 11/1942 |
| GB | 1317736 | A1 | 5/1973 |
| WO | 9726084 | A1 | 7/1997 |
| WO | 9838293 | A1 | 9/1998 |
| WO | 03054523 | A2 | 7/2003 |
| WO | 2007129284 | A1 | 11/2007 |
| WO | 2007132384 | A2 | 11/2007 |
| WO | 2008044162 | A2 | 4/2008 |
| WO | 2008155716 | A1 | 12/2008 |
| WO | 2010031679 | A1 | 3/2010 |

OTHER PUBLICATIONS

Rida, A. et al "Long-Range Transport of Magnetic Microbeads using Simple Planar Coils placed in a Uniform Magnetostatic Field" Applied Physics Letters, vol. 83, No. 12, Sep. 2003, pp. 2396-2398.

* cited by examiner

APPARATUS FOR THE ENRICHMENT OF MAGNETIC PARTICLES

FIELD OF THE INVENTION

The invention relates to a method and a corresponding preparation apparatus for the enrichment of magnetic particles in a sample fluid.

BACKGROUND OF THE INVENTION

The WO 2008/155716 discloses an optical biosensor in which an input light beam is totally internally reflected and the resulting output light beam is detected and evaluated with respect to the amount of target components at the reflection surface. The target components comprise magnetic particles as labels, which allows to affect the processes in the sample by magnetic forces.

SUMMARY OF THE INVENTION

Based on this background it was an object of the present invention to provide means that allow to detect low concentrations of target substances with a biosensor.

This object is achieved by a preparation apparatus and a method of operating the same. Various embodiments are disclosed in the claims.

According to its first aspect, the invention relates to a preparation apparatus for the enrichment of magnetic particles in a sample fluid. In this context, the combination of a particular type of magnetic particles and a particular sample fluid shall be considered as being given and having predetermined characteristics, particularly in terms of magnetic properties of the magnetic particles and their migration velocity in the sample fluid under the influence of e.g. magnetic forces. The preparation apparatus has a design that is adapted to the given magnetic particles and sample fluid. It comprises an actuator magnet with a first and a second magnetic pole, wherein the following features shall be realized:

a) Said poles of the actuator magnet are separated by a sample space into which a sample cartridge with the given sample fluid can be inserted. Treatment of the sample fluid can hence be done in the gap between the two poles, where the magnetic field concentrates.

b) The first pole is tapered with a single (connected) tip region at which the distance of the second pole from the surface points of the first pole is locally minimal. A "local minimum" of the distance of an object X from a surface point means that said point has no neighboring points on the surface for which the distance to X is smaller (however, neighboring points may have the same distance and hence also belong to the tip region). As there shall only be a single local minimum of the distance (assumed in the tip region of the first pole), this distance is simultaneously also the global distance minimum between the poles.

c) The actuator magnet is designed such that the magnetic flux in the sample space can (during operation of the apparatus) be made high enough to magnetize the given magnetic particles (when they are in the sample space) to at least about 50%, preferably to about 90% of their saturation magnetization (wherein "about" typically means±20% of the respective value). The concrete value of the minimal magnetic flux which has to be provided throughout the sample space has to be derived from the properties of the given magnetic particles, which can readily be done based on available data sheets or simple measurements.

d) Furthermore, the actuator magnet shall be designed such that there is a magnetic field gradient in the sample space (during operation of the apparatus) which can be made large enough to induce migration of the given magnetic particles (when they are in the sample space) with at least a given average migration velocity. The average migration velocity is a design parameter that has to be chosen in advance. The higher its value, the faster the enrichment of magnetic particles will be. In typical examples, the minimum average migration velocity ranges between about 1 μm/s and 1 mm/s. Based on the given value of the average migration velocity, the required magnetic field gradient in the sample space can readily be derived from data sheets or measurements with the given magnetic particles and sample fluid.

The invention further relates to a corresponding method for the enrichment of magnetic particles in a sample fluid having given characteristics, said method comprising the following steps:

a) Providing the sample fluid with the magnetic particles in a sample space.

b) Establishing a magnetic flux in the sample space that is high enough to magnetize the given magnetic particles to at least about 50%, preferably to about 90% of their saturation magnetization.

c) Establishing a magnetic field gradient in the sample space that is large enough to induce migration of the magnetic particles with at least a given average migration velocity, wherein said migration is directed towards a single tip region.

The method comprises in general terms a procedure that can be executed with the preparation apparatus defined above. Consequently, the method is preferably executed with such an apparatus.

The preparation apparatus and the method described above have the advantage that they allow the enrichment of magnetic particles in a sample fluid with high efficiency, as both the magnetic flux and the magnetic field gradient in the sample fluid are determined with respect to the properties of the particular magnetic particles and sample fluid under consideration. It is possible to use this apparatus and method to enrich magnetically labeled target components of a sample to a level at which they can readily and reliably be detected by a biosensor, or can be further manipulated and processed, e.g. in an integrated lab-on-a-chip device or cartridge. The detection limit of the biosensor can hence be extended while still providing a procedure that is suited for a simple and rapid (e.g. outdoor) application. Compactness makes the apparatus particularly apt for an integration with further components (e.g. a biosensor), yielding a favorable near-patient (point-of-care) setting.

In the following, further developments of the invention will be described that relate to both the preparation apparatus and the method described above.

Concrete values for the magnetic flux that shall be established in the sample space preferably range above about 50 mT. Most preferred is a value of about 100 mT. With these values, the desired degree of magnetization can be achieved for a large class of magnetic particles that are often used in practice (e.g. superparamagnetic beads having a diameter of typically between about 3 nm and 5 μm).

A concrete value for the magnetic field gradient that shall be established during operation (everywhere) in the sample space is at least 0.2 T/m, preferably at least 0.6 T/m. These values prove to generate satisfactory migration velocities for a large class of practically important magnetic particles and a sample fluids. Typical average migration velocities that can be achieved by such gradient values range between about 10 μm/s and 300 μm/s.

The sample space preferably has a volume of about 0.1 ml to about 10 ml, most preferably of about 1 ml. As many known biosensors process small sample volumes of some μl, an enrichment factor of about 1000 can be achieved when an initial sample volume of about one ml is reduced to the μl size required by the biosensor. The detection limit of the bio sensor can hence be extended by several orders of magnitude.

The maximal distance of the surface points of the first pole from the second pole preferably ranges between about 5 mm and about 20 mm. The concrete values will be chosen according to the applied electrical excitation, i.e. the power input at given coil dimensions. Hence a quite typical value is about 10 mm.

The minimal distance of the surface points of the first pole from the second pole preferably ranges between about 2 mm and about 18 mm, preferably having a value of about 4.5 mm.

Furthermore, at least one of the poles of the actuator magnet preferably covers an area between about 100 $mm^2$ and about 600 $mm^2$, preferably of about 300 $mm^2$. In this context, the "area of a pole" is defined by the cross-section perpendicular to the mean direction of the magnetic field between the poles. Preferably, the respective areas of the two poles are substantially of the same size.

The above mentioned specific values for the geometry of the poles prove to be suited for many typical boundary conditions occurring in practice.

By definition, the "tip region" of the first pole is the (connected) area where the distance of surface points of the first pole to the second pole is locally minimal. For this reason, the tip region (or, more precisely, the sample space volume adjacent to the tip region) will be the target zone to which magnetic particles in the sample space migrate under the influence of the applied magnetic fields. Depending on the particular design of the poles, the tip region may be a two-dimensional area, an (approximately) one-dimensional line, or (approximately) a point. The latter embodiment has the advantage to provide the highest spatial concentration of magnetic particles during the enrichment procedure.

In general, the surface of the first pole as well as the surface of the second pole may be arbitrarily shaped as long as the postulated features (e.g. the existence of a single tip region) are fulfilled. The surface shape of the tapered first pole can be optimized with respect to its intended effects, e.g. by implementing a parabolic shape that enables a stronger field gradient in the outer regions of the cartridge, which could accelerate the movement of single particles that are present in said region.

In a preferred embodiment, the surface of the first pole is composed of one or more planar facets. Such facets can readily be manufactured. Moreover, in combination with a similarly simple (e.g. planar) surface of the second pole, the extremes of the magnetic field gradient can readily be estimated for such a design as occurring along the edges of the facets.

According to another preferred embodiment of the invention, the actuator magnet comprises a yoke with two opposing ends that constitute the first and second pole with the intermediate sample space. As usual, a "yoke" denotes a (bended) bar of a material with high magnetic permeability that is used to concentrate magnetic field lines.

According to a further development of the aforementioned embodiment, the yoke extends through at least one electromagnetic coil. Supplying this coil with electrical currents can hence be used to controllably generate a magnetic field which is guided by the yoke to the sample space between the poles.

The aforementioned coil is preferably designed such that it has a number N≥1 of windings which can be supplied with current I (in a stable operation mode, i.e. observing given current-density limits etc.), wherein the product N·I ranges between about 500 A and about 2000 A. It is feasible to design an actuator magnet for these values that is suited for the integration into a compact enrichment apparatus and that provides an appropriate magnetic field in the sample space.

According to another embodiment, the yoke may comprise a permanent magnet for generating a magnetic field in the yoke and hence between the poles. The permanent magnet may be used alone or in combination with the aforementioned electromagnetic coil. The permanent magnet may optionally constitute an exchangeable component that can be inserted into the yoke if desired or that can be removed from the yoke (and e.g. be replaced by a neutral piece of yoke material).

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

Like reference numbers or numbers differing by integer multiples of 100 refer in the Figures to identical or similar components.

DESCRIPTION OF PREFERRED EMBODIMENTS

Figure 1:
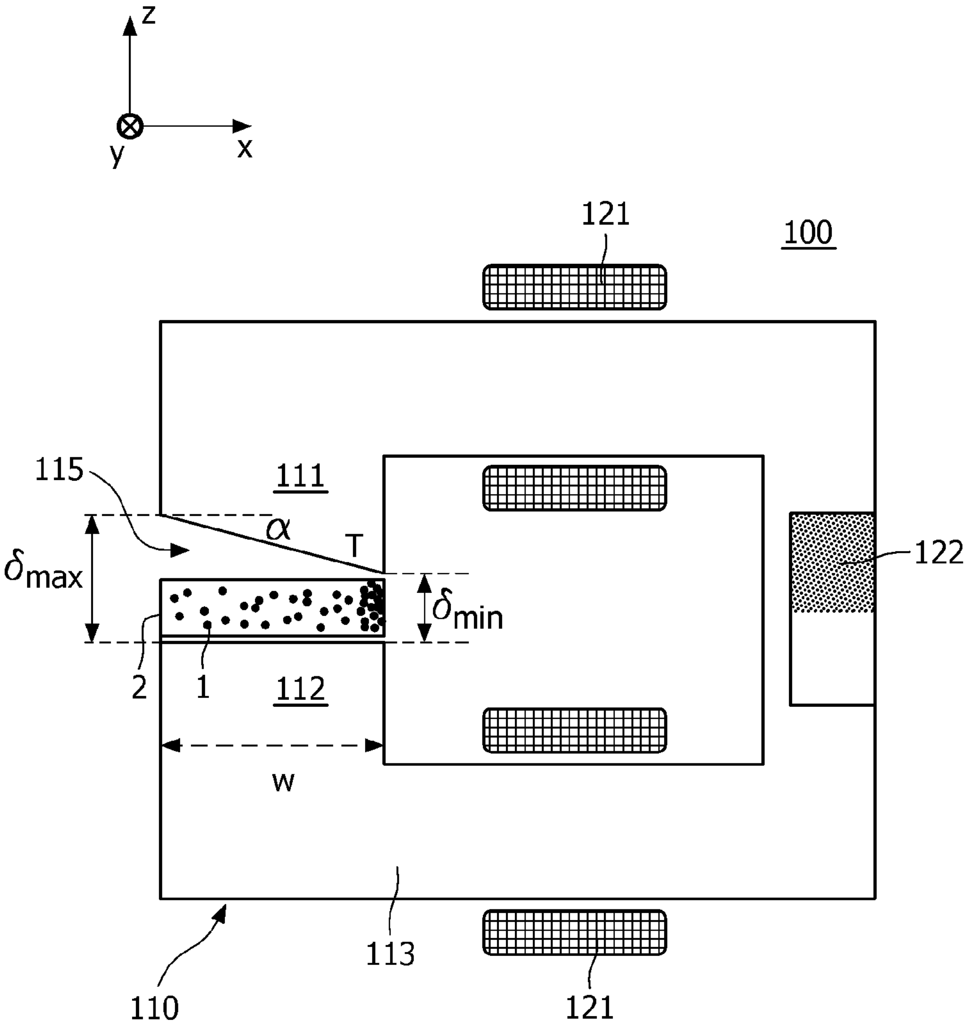
FIG. 1 schematically shows a preparation apparatus according to a first embodiment of the invention.

The detection of nucleic acids in a biological fluid requires a series of processing steps, such as sample enrichment, cell lysis, DNA isolation and amplification. Since the target analyte is often only available in trace amounts, large sample volumes are needed to collect a statistically sufficient amount of molecules. In such an environment, the detection is hampered by the background noise originating from other constituents of the sample, such as blood cells or cell debris. Hence, it is desirable to extract the available target molecules and to introduce them into a smaller volume, thus effectively enhancing their concentration. As a result, the requirements imposed by the detection limit of the subsequent sensing processes can be met.

Moreover, the processable sample volume of a bio sensor is ideally not larger than several microliters such that the typical characteristics of a microfluidic device, e.g. low consumption of reagents and rapid reaction kinetics, can be realized. However, lowly concentrated samples of this size might not contain enough target molecules to enable reliable detection results.

In a biosensor based on magnetic particles (beads), the target molecules (e.g. nucleic acids) may be caught from an initial volume by specific or non-specific attachment to the surface of said beads. In an enrichment step, an external magnetic field may then be used to collect the particles from the initial volume and transfer them to a confined region, thereby increasing their local concentration and preparing them for further processing.

In such a biosensor based on magnetic beads, the technological challenge arises from the typically large initial volume of the sample to be purified, which is here assumed to be at least 1 ml. Previous technological solutions towards the directed movement of magnetic beads commonly handle considerably smaller fluid volumes and cannot be easily adapted to the desirable sample size because the range of the generated magnetic forces is insufficient (cf. A. Rida, V. Fernandez, and M. A. M. Gijs, "Long-range transport of magnetic microbeads using simple planar coils placed in a uniform magnetostatic field", Applied Physics Letters, vol. 83, no. 12, pp. 2396-2398, 2003; J. Joung, J. Shen, and P. Grodzinski, "Micropumps based on alternating high-gradient magnetic fields", IEEE Transactions on Magnetics, vol. 40, no. 4, pp. 1944-1946, 2004). Other known designs for the purification of sample volumes by using magnetic beads feature numerous moving parts and are therefore not robust enough for hand-held solutions (EP 1 621 890 A1).

For the above reasons, efficient sample purification is considered a vital feature of future biosensor applications. It is therefore desirable to develop a magnetic actuator that fulfils as many as possible of the following requirements:

It can concentrate suspended magnetic beads from a milliliter volume into a microliter volume.

It works power-efficiently enough to allow for off-the-grid operation.

It finishes the enrichment process in less than about 5 minutes.

It is compatible with ensuing process steps.

It ideally works without mechanically moving parts.

To meet the above requirements, a preparation apparatus is proposed here in which the actuation unit consists of a magnetic circuit comprising an air gap and at least one magnetic field generator, e.g. a field coil. At least one of the pole tips of the apparatus has a tapered shape such that a region of least distance exists between the pole tips. During operation of the apparatus, the magnetic flux density between the pole tips exhibits a maximum at the position of least distance. If a fluid sample containing magnetic beads in suspension is introduced into the air gap, the gradient of the magnetic field will elicit the migration of particles towards the maximum of the magnetic field.

FIG. 1 shows schematically in a side view a preparation apparatus 100 according to an embodiment of the above principles. As a main component, the preparation apparatus 100 comprises an actuator magnet 110, which is realized (inter alia) by a C-shaped yoke 113 having a first pole 111 and a second pole 112 that are disposed opposite to each other with an intermediate air gap or sample space 115 between them. Two branches of the yoke 113 are surrounded by coils 121 that can be supplied with an electrical current to generate a magnetic field in the yoke and correspondingly in the sample space 115. Furthermore, a permanent magnet 122 may optionally be integrated into the yoke, preferably such that it may be replaced by a piece of "normal" yoke material if desired.

While the second pole 112 has a flat surface that is perpendicular to the yoke axis in this branch (z-direction), the first pole 111 is tapered (wedge shaped) with a single tip T at one end. The distance between points on the surface of the first pole 111 and the second pole 112 hence decreases from a maximum value $\delta_{max}$ to a minimal value $\delta_{min}$, which is assumed at the tip T (it should be noted that this distance is defined asymmetrically, i.e. considering single points on the surface of the first pole in relation to the whole second pole). The width of the first and second poles 111, 112 in x-direction is w. Assuming a square cross section, the same value w describes the depth of the poles in y-direction. From the values $\delta_{min}$, $\delta_{max}$, and w, the slope angle α of the first pole 111 can be calculated by $$\tan\alpha = \frac{\delta_{max} - \delta_{min}}{w}.$$

Analysis shows that this angle α of slope is directly proportional to the achievable force on a particle between the poles.

FIG. 1 further shows that a sample cartridge 2 comprising a sample liquid with magnetic particles 1 is inserted into the sample space 115 between the poles of the actuator magnet 110. The sample cartridge 2 has the shape of a cuboid with the volume $$V = w^2\delta_{min}$$

(neglecting the wall thickness of the sample cartridge). This volume V preferably has a value of about 1 ml.

During operation of the preparation apparatus 100, the magnetic particles 1 are moved by the magnetic field gradient towards the point T of least distance between the poles 111, 112. Since it is desirable to integrate the sample enrichment with subsequent stages of the analytical process (e.g. a process according to WO 2008/155716), it has to be possible to readily remove beads from the sample cartridge 2. As shown in the Figure, it is therefore favorable to place the collection area at the outer border of the sample cartridge 2.

The shape of the poles 111, 112 is optimized with respect to the achievable traversal time of a single magnetic bead. To this end, the following boundary conditions can be assumed:

The electrical excitation N·I of the magnetic circuit is fixed (with N being the number of windings of the coils 121 and I the current applied to the coils). The concrete value of N·I may be determined based on constraints with respect to a practical size of the coils and the maximum current that can permanently be applied.

The magnetic flux density in every point of the sample space 115 between the poles shall at least be $B_{min}$=100 mT. This value is motivated by the postulation that the used magnetic beads should be magnetized to about 90% of their saturation magnetization, because migration velocity of the beads is proportional to their magnetization. The concrete value of $B_{min}$ can be found from corresponding data sheets of the beads.

The maximum width $\delta_{max}$ of the sample space 115 is then fixed to a value that guarantees the magnetic flux density $B_{min}$ at the given electrical excitation N·I.

Figure 2:
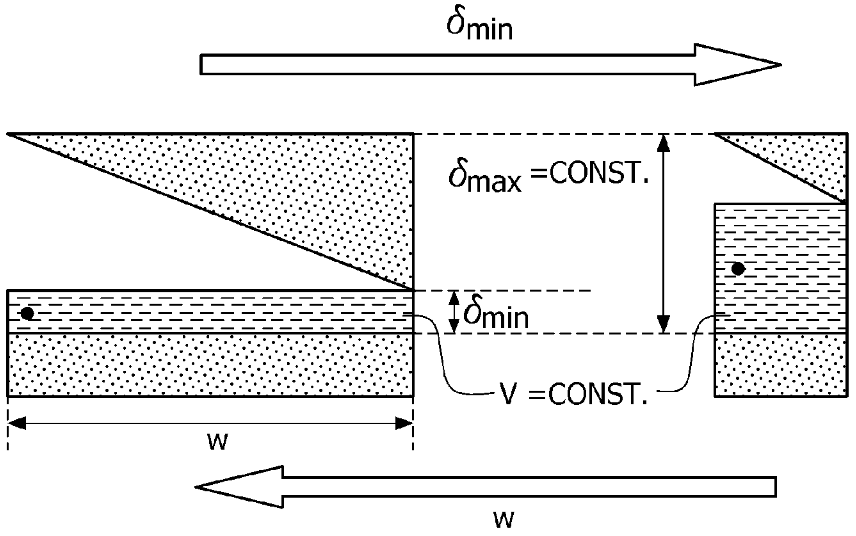
FIG. 2 illustrates conflicting effects that the slope and width of a pole tip have on the travel time of magnetic beads.

Under these premises, the values for $\delta_{min}$ and w may be varied under the condition that the available volume V for the box-shaped cartridge 2 remains constant, and that the total travel time $T_{bead}$ a bead needs for the transversal migration through the whole sample space (i.e. across distance w) is minimal. FIG. 2 illustrates the conflicting effects of the variables $\delta_{min}$ and w on the travel time $T_{bead}$: Decreasing width w reduces the distance a magnetic particle has to travel, but reduces also the field gradient as $\delta_{min}$ increases. The optimal combination of w and $\delta_{min}$, which minimizes the travel time $T_{bead}$, can be found by theoretical analysis or experiments.

For an electrical excitation of N·I=800 A and a volume of V=1 ml, the following parameters can thus be determined:

minimum air gap $\delta_{min}$=4.5 mm,
maximum air gap $\delta_{max}$=10 mm,
width of poles w=17 mm.

While a box-shaped, cuboid cartridge 2 has been assumed for the optimization, the implementation of a specifically shaped cartridge that exactly fits into the sample space 115 will allow for larger sample volumes V. The determined optimum values are expected to be approximately invariant to such a change of the shape of the cartridge.

Figure 3:
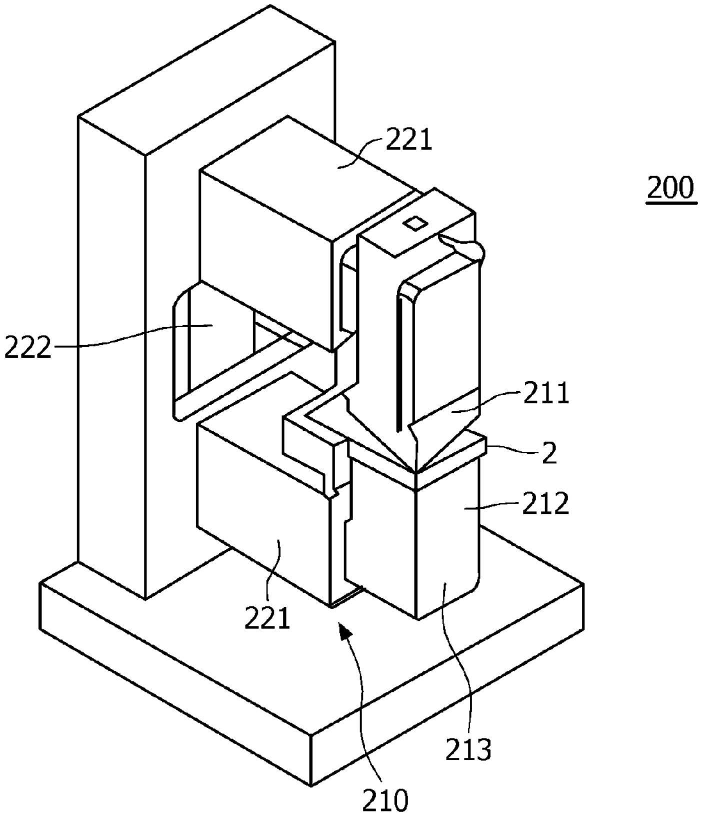
FIG. 3 shows a perspective view of a concrete realization of a preparation apparatus.

FIG. 3 shows in a perspective view a concrete realization of a preparation apparatus 200 according to the present invention. As in FIG. 1, the apparatus comprises an actuation magnet 210 with is a C-shaped yoke 213 that is mounted to a yoke holder on a base plate. The yoke 213 comprises an exchangeable yoke element, for example a permanent magnet 222, and two copper coils 221 (with typically N=700 windings and a wire diameter of 0.5 mm). A cuboid-shaped sample cartridge 2 is disposed in the sample space between a first, tapered pole 211 and a flat second pole 212. The gap between the poles typically has a width between a minimum of 4.5 mm and a maximum of 10 mm. The first pole 211 is exchangeable and has a single tip in one corner.

Figure 4:
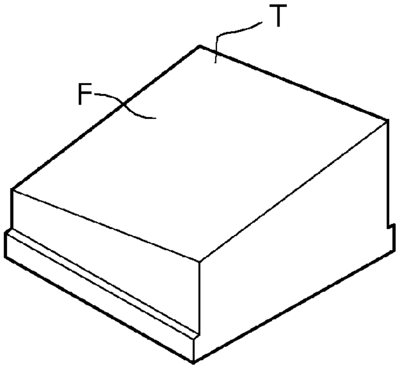
FIG. 4 shows a pole for the apparatus of FIG. 3 with one facet.

FIG. 4 shows a possible design of an exchangeable tip that can be used as a first pole 211 in the apparatus 200 of FIG. 3. The tip surface is constituted by just one facet F slanted in two directions such that it yields a single tip T in one corner.

Figure 5:
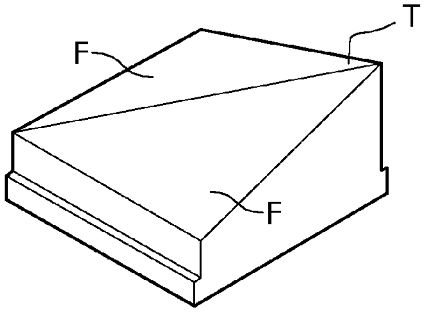
FIG. 5 shows a pole for the apparatus of FIG. 3 with two facets.

FIG. 5 shows an alternative design of an exchangeable tip with a surface that is composed of two triangular facets F.

Figure 6:
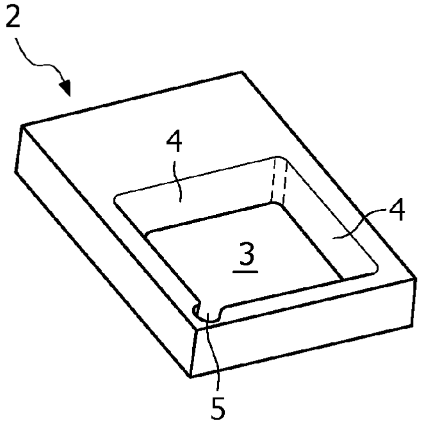
FIG. 6 shows an exemplary sample cartridge.

FIG. 6 shows a possible design of a sample cartridge 2 in which the sample fluid with magnetic particles can be provided. The sample cartridge 2 has the shape of a cuboid or box with a sample chamber 3 of square cross section that can be filled via two inlets 4. One corner of the sample chamber 3 provides a target area 5 at which magnetic particles can collect when a sample cartridge 2 is inserted into a preparation apparatus according to the invention. An outlet or a connection to other fluidic chambers is provided in this corner, too. It should be noted that the walls of the sample cartridge 2 are comparatively thick to ensure that the sample fluid has a sufficient distance from the borders of the magnetic poles, hence avoiding artifacts occurring there.

By assigning a time constant to the enrichment process, the performance of the system with respect to changes of the parameters actuation current, particle concentration, pole tip geometry and bead type could be quantified. The results show that the enrichment of a typical sample consisting of an aqueous solution with 2.8 μm large magnetic beads at a concentration of $10^6$ per ml could be enriched in less than 5 minutes at a power consumption of less than 5 W.

While the invention was described above with reference to particular embodiments, various modifications and extensions are possible, for example:

The poles of the actuation magnet may have other forms than the shown ones, for example they may both tapered.

The sensor that is applied to the enriched sample can be any suitable sensor to detect the presence of magnetic particles on or near to a sensor surface, based on any property of the particles, e.g. it can detect via magnetic methods, optical methods (e.g. imaging, fluorescence, chemiluminescence, absorption, scattering, evanescent field techniques, surface plasmon resonance, Raman, etc.), sonic detection (e.g. surface acoustic wave, bulk acoustic wave, cantilever, quartz crystal etc), electrical detection (e.g. conduction, impedance, amperometric, redox cycling), combinations thereof, etc. A magnetic sensor can be any suitable sensor based on the detection of the magnetic properties of the particle on or near to a sensor surface, e.g. a coil, magneto-resistive sensor, magneto-restrictive sensor, Hall sensor, planar Hall sensor, flux gate sensor, SQUID, magnetic resonance sensor, etc.

In addition to molecular assays, also larger moieties can be processed and detected with devices according to the invention, e.g. cells, viruses, or fractions of cells or viruses, tissue extract, etc.

The particles serving as labels can be detected directly by the sensing method. As well, the particles and/or the biological targets on their surface can be further processed prior to detection. An example of further processing is that materials are added or released, or that the (bio)chemical or physical properties of the label and/or the biological targets are modified to facilitate detection. The particles and/or biological targets can be further manipulated and processed, e.g. in an integrated lab-on-a-chip device or in a disposable cartridge.

The device and method can be used in combination with rapid, robust, and easy to use point-of-care biosensors for small sample volumes. The sample cartridge can be a disposable item. Also, the device, methods and systems of the present invention can be used in automated high-throughput testing.

The magnetic particles or beads typically have at least one dimension ranging between 3 nm and 5000 nm, preferably between 500 nm and 5000 nm, more preferred between 1000 nm and 5000 nm. Experiments with 2.8 μm beads showed the best performance in comparison with 1 μm and 500 nm beads. Larger beads are expected to lead to even better results.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:

1. A method for the enrichment of magnetic particles in a sample fluid having given characteristics, the sample fluid being contained in sample cartridge insertable in a sample space defined by a gap separating first and second pole of an actuator magnet, the first pole having a substantially wedged shape with a single tip region at one end, and thus being tapered with respect to the second pole and having a single tip region at one end, the method comprising:

a) providing the sample fluid in the sample space;

b) establishing a magnetic flux in the sample space that is high enough to magnetize the magnetic particles to at least 50% of their saturation magnetization;

c) establishing a magnetic field gradient in the sample space that is large enough to induce migration of the magnetic particles in the sample space with a given minimum average velocity along the sample space towards the single tip region.

2. The method according to claim 1, wherein establishing the magnetic flux and the magnetic filed gradient in the sample space enriches the magnetic particles in the sample fluid having given characteristics.

3. The method according to claim 1, wherein the tip region is a approximately a point.

4. A preparation apparatus for enrichment of magnetic particles in a sample fluid having given characteristics, the apparatus comprising:

an actuator magnet comprising a yoke having a first pole and a second pole opposing the first pole, the first and second poles being separated by an intermediate gap that defines a sample space configured to receive a sample cartridge in which the sample fluid is insertable, wherein the first pole is tapered at a slope with respect to the second pole with a single tip region at one end of the intermediate gap, a distance between surface points of the first pole and surface points the second pole being a locally minimal value at the single tip region, and wherein a magnetic field gradient in the sample space is large enough to induce migration of the magnetic particles in the sample fluid with a given minimum average velocity, the migration of the magnetic particles being directed towards the single tip region, and wherein the slope is directly proportional to achievable force on the magnetic particles between the first pole and the second pole.

5. The apparatus according to claim 4, wherein magnetic flux in the sample space is high enough to magnetize the magnetic particles to at least 50% of their saturation magnetization.

6. The apparatus according to claim 5, wherein the magnetic flux in the sample space is about 100 mT.

7. The apparatus according to claim 4, wherein the magnetic field gradient in the sample space is about 0.6 T/m.

8. The apparatus according to claim 4, wherein the sample space has a volume of about 0.1 ml to about 10 ml.

9. The apparatus according to claim 4, a maximal distance between the first pole and the second pole ranges between about 5 mm and about 20 mm.

10. The apparatus according to claim 4, wherein the minimal distance between second pole and the first pole ranges between about 2 mm and about 18 mm.

11. The apparatus according to claim 4, wherein at least one of the first and second poles has an area between about 100 $mm^2$ and about 600 $mm^2$.

12. The apparatus according to claim 4, wherein a surface of the first pole comprises planar facets.

13. The apparatus according to claim 4, wherein the yoke extends through at least one coil.

14. The apparatus according to claim 13, wherein the at least one coil has N windings and is driven with a current I, wherein a product of N and I ranges between about 500 A and about 2000 A.

15. The apparatus according to claim 4, wherein the yoke comprises a permanent magnet.

16. The apparatus according to claim 4, wherein the tip region is a two-dimensional area or approximately a one-dimensional line.

17. The apparatus according to claim 4, wherein the second pole has a flat surface substantially perpendicular to an axis of the yoke and the first pole has a wedge shape with a single tip at one end, such that distances between points on surfaces of the first pole and the second pole, respectively, decrease from a maximum value to the locally minimal value.

18. An actuator magnet in a preparation apparatus for enrichment of magnetic particles in a sample fluid injected in a sample cartridge, the actuator magnet comprising:

a yoke having a first branch and corresponding first pole and a second branch and corresponding second pole opposite the first pole, the first and second poles being separated by an intermediate gap that defines a sample space configured to receive the sample cartridge; and a plurality of coils surrounding each of the first and second branches, the plurality of coils are configured to generate a magnetic field in the yoke and in the sample space when supplied with an electrical current, wherein the second pole has a flat surface that is substantially perpendicular to an axis of the yoke and the first pole is tapered at a slope with respect to the surface of the second pole, providing a single tip region at one end, a distance between the first pole and the second pole in the sample space being locally minimal at the single tip region, and wherein a magnetic field gradient in the sample space induces migration of the magnetic particles in the sample fluid towards the single tip region, and wherein the slope is directly proportional to achievable force on the magnetic particles between the first pole and the second pole.

19. A yoke-shaped actuator magnet, comprising:

a wedge-shaped first pole having a planar surface sloped toward a tip region of the first pole;

a second pole having a planar surface with no slope, the second pole being separated from the first pole by an intermediate gap defining a sample space configured to receive a sample cartridge containing a sample fluid, wherein a distance between the second pole and the first pole in the sample space is locally minimal at the tip region; and wherein a magnetic field gradient in the sample space induces magnetic particles within the sample fluid to migrate towards the tip region.

* * * * *